US008201123B1

United States Patent
Nethercot et al.

(10) Patent No.: US 8,201,123 B1
(45) Date of Patent: Jun. 12, 2012

(54) AUTOMATIC INPUT/OUTPUT TIMING ADJUSTMENT FLOW FOR PROGRAMMABLE INTEGRATED CIRCUITS

(75) Inventors: Mark R. Nethercot, Peebles (GB); Stuart A. Nisbet, Edinburgh (GB)

(73) Assignee: Xilinx, Inc., San Jose, CA (US)

( * ) Notice: Subject to any disclaimer, the term of this patent is extended or adjusted under 35 U.S.C. 154(b) by 420 days.

(21) Appl. No.: 12/394,949

(22) Filed: Feb. 27, 2009

(51) Int. Cl.
*G06F 17/50* (2006.01)
(52) U.S. Cl. ...................................................... 716/113
(58) Field of Classification Search ............ 716/50–139; 327/161, 163, 231–253; 713/400–601
See application file for complete search history.

(56) References Cited

U.S. PATENT DOCUMENTS

6,735,543 B2 * 5/2004 Douskey et al. ............... 702/120
7,557,606 B1 * 7/2009 Chen et al. ...................... 326/38
* cited by examiner

*Primary Examiner* — Vuthe Siek
*Assistant Examiner* — Aric Lin
(74) *Attorney, Agent, or Firm* — Kevin T. Cuenot (57) ABSTRACT

A method of tuning an input/output (I/O) interface of a circuit design for a selected programmable integrated circuit can include determining whether the I/O interface meets a timing requirement and when the I/O interface does not meet the timing requirement, automatically adjusting a first timing setting of the I/O interface of the circuit design. The method can include iteratively determining whether the I/O interface meets the timing requirement, and responsive to each iteration, adjusting the first timing setting. The circuit design, including the adjusted first timing setting, can be output.

20 Claims, 2 Drawing Sheets

AUTOMATIC INPUT/OUTPUT TIMING ADJUSTMENT FLOW FOR PROGRAMMABLE INTEGRATED CIRCUITS

FIELD OF THE INVENTION

One or more embodiments disclosed herein relate to integrated circuits (ICs). More particularly, one or more embodiments relate to adjusting the timing of an input/output interface of a circuit design for implementation within a programmable IC.

BACKGROUND

Programmable integrated circuits (ICs) are a well-known type of integrated circuit that can be programmed to perform specified logic functions. One type of programmable IC, the field programmable gate array (FPGA), typically includes an array of programmable tiles. These programmable tiles can include, for example, input/output blocks (IOBs), configurable logic blocks (CLBs), dedicated random access memory blocks (BRAM), multipliers, digital signal processing blocks (DSPs), processors, clock managers, delay lock loops (DLLs), and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Another type of programmable IC is the Complex Programmable Logic Device, or CPLD. A CPLD includes two or more "function blocks" connected together and to input/output (I/O) resources by an interconnect switch matrix. Each function block of the CPLD includes a two-level AND/OR structure similar to those used in Programmable Logic Arrays (PLAs) and Programmable Array Logic (PAL) devices. In CPLDs, configuration data is typically stored on-chip in non-volatile memory. In some CPLDs, configuration data is stored on-chip in non-volatile memory, then downloaded to volatile memory as part of an initial configuration (programming) sequence.

For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The phrase "programmable IC" can include, but is not limited to these exemplary devices, as well as encompassing devices that are only partially programmable. For example, one type of programmable IC includes a combination of hard-coded transistor logic and a programmable switch fabric that programmably interconnects the hard-coded transistor logic.

Circuit designs are implemented within a programmable IC by mapping constructs of the programmatic circuit description to hardware elements available on the programmable IC. The mapped constructs then can be placed. That is, the mapped constructs can be assigned to particular hardware elements, each having a defined location, on the programmable IC. The various elements can be connected using the programmable interconnect fabric during the routing process.

Achieving timing closure of the circuit design with respect to map, place, and route refers to achieving timing for internal signal paths of the circuit design. Timing closure for external paths, e.g., the I/O interface of the programmable IC, still must be achieved. The timing of the I/O interface, which includes data signals entering the programmable IC and data signals leaving the programmable IC, as well as clock signals, often must be altered to ensure that the circuit design, once implemented within the programmable IC, functions properly. Presently, tuning the I/O interface is a manual, time consuming process. Any modification to the underlying circuit design usually necessitates retuning of the I/O interface. Whenever any circuit design is to be implemented for a variety of different programmable IC architectures, the I/O interface tuning process must be started anew for each different programmable IC architecture since the tuning parameters realized for one programmable IC architecture usually do not work when the circuit design is migrated to another different programmable IC architecture.

One difficulty in tuning I/O interfaces is that within some programmable ICs, the clock is distributed throughout the device using dedicated, global clock routing resources. These resources are independent of the routing resources available for implementing the user-specified portion of the circuit design. It is often the case that the clock signals will incur a different latency, often larger, than the input delays observed on data signals entering the programmable IC. In some cases, the difference may be on the order of 4 to 5 nanoseconds. The clock and/or the data must be delayed to achieve the necessary I/O interface timing closure.

Taking an example, some cores, such as a core implementing Ethernet Reduced Gigabit Media Independent Interface (RGMII), must operate with the clock falling in the center of a window only 2 nanoseconds in width. Tuning the I/O interface to meet such a tolerance typically requires significant manual adjusting of the I/O interface parameters and multiple iterations of the design flow. Once timing closure is achieved for a core for one programmable IC architecture, however, the I/O interface tuning process must be started anew for every other programmable IC architecture for which the core is to be developed.

In general, a core refers to a pre-designed, programmatic description of hardware that performs a particular function. A core can include a predetermined set of configuration bits that program the programmable IC to perform one or more functions. Alternatively, a core can include source code or schematics that describe the logic and connectivity of a design. Typical cores can provide, but are not limited to, digital signal processing (DSP) functions, memories, storage elements, and math functions. Some cores include an optimally floor-planned layout targeted to a specific family of programmable ICs. Cores can also be parameterizable in that the user may enter parameters to activate or change certain functionality of the core.

SUMMARY

One or more embodiments disclosed within this specification relate to adjusting the timing of an input/output (I/O)

interface of a circuit design implemented within a programmable integrated circuit (IC). One embodiment of the present invention can include a computer-implemented method of tuning an I/O interface of a circuit design for a selected programmable IC. The method can include determining whether the I/O interface meets a timing requirement and, when the I/O interface does not meet the timing requirement, automatically adjusting a first timing setting of the I/O interface of the circuit design for the selected programmable IC. The method can include iteratively determining whether the I/O interface meets the timing requirement and, responsive to each iteration, adjusting the first timing setting. The circuit design, including the adjusted first timing setting, can be output.

The first timing setting can be selected to be clock phase delay or delay of an I/O data signal. The method can include only adjusting the first timing setting of the I/O interface after place and route has been performed and timing closure of internal signals of the circuit design has been achieved. In another aspect, the method can include adjusting the first timing setting of the I/O interface during place and route concurrently with achieving timing closure for internal signals of the circuit design.

Iteratively determining whether the I/O interface meets a timing requirement and adjusting the first timing setting can be performed without changing placement of the circuit design and/or without changing routing of the circuit design.

Prior to outputting the circuit design, the method can include determining that an exit criterion has been met, that the I/O interface does not meet the timing requirement, and automatically adjusting a second timing setting of the I/O interface of the circuit design. When the first timing setting is clock phase delay, the second timing setting can be selected to be delay of an I/O data signal. When the first timing setting is delay of an I/O data signal, the second timing setting can be selected to be clock phase delay.

Another embodiment of the present invention can include a computer-implemented method of tuning an I/O interface of a circuit design for a selected programmable IC including determining whether the I/O interface meets a timing requirement and, when the I/O interface does not meet the timing requirement, selecting a first timing setting for the I/O interface according to a timing analysis and available timing settings of the I/O interface. The method can include automatically adjusting the first timing setting of the I/O interface of the circuit design, iteratively determining whether the I/O interface meets the timing requirement, and responsive to each iteration, adjusting the first timing setting of the I/O interface. The circuit design, including the adjusted first timing setting, can be output.

The first timing setting can be selected to be clock phase delay or delay of an I/O data signal. The method can include only adjusting the first timing setting after performing place and route and after achieving timing closure of internal signals of the circuit design. In another aspect, the method can include adjusting the first timing setting during place and route concurrently with achieving timing closure for internal signals of the circuit design.

Iteratively determining whether the I/O interface meets a timing requirement and adjusting the first timing setting can be performed without changing placement of the circuit design and/or without changing the routing of the circuit design.

Prior to outputting the circuit design, the method can include determining that an exit criterion has been met and that the I/O interface does not meet the timing requirement. In that case, a second timing setting of the I/O interface of the circuit design can be automatically adjusted. When the first timing setting is clock phase delay, the second timing setting can be delay of an I/O data signal. When the first timing setting is delay of an I/O data signal, the second timing setting can be clock phase delay.

Another embodiment of the present invention can include a computer program product including a computer-usable medium having computer-usable program code that tunes an I/O interface of a circuit design for a selected programmable IC. The computer-usable medium can include computer-usable program code that determines whether the I/O interface meets a timing requirement and computer-usable program code that, when the I/O interface does not meet the timing requirement, automatically adjusts a first timing setting of the I/O interface of the circuit design. The computer-usable medium can include computer-usable program code that iteratively determines whether the I/O interface meets the timing requirement, and responsive to each iteration, adjusts the first timing setting and computer-usable program code that outputs the circuit design including the adjusted first timing setting.

The computer-usable medium further can include computer-usable program code that selects the first timing setting to be clock phase delay or a delay of an I/O data signal according to an architecture of the programmable IC within which the circuit design is to be implemented and a result from a timing check of the I/O interface.

The computer-usable medium can include computer-usable program code that, prior to outputting the circuit design, determines that an exit criterion has been met, that the I/O interface does not meet the timing requirement, and automatically adjusts a second timing setting of the I/O interface. When the first timing setting is clock phase delay, the second timing setting can be delay of an I/O data signal. When the first timing setting is delay of an I/O data signal, the second timing setting can be clock phase delay.

DETAILED DESCRIPTION OF THE DRAWINGS

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

One or more embodiments relate to adjusting the timing characteristics of an input/output (I/O) interface of a circuit design that is to be implemented within a programmable integrated circuit (IC). In accordance with one or more embodiments disclosed herein, one or more timing settings for an I/O interface can be automatically adjusted to ensure that the I/O interface conforms with specified timing requirements. Adjustments to the I/O interface can be made in a manner that does not disturb placement and/or routing of the circuit design, particularly in cases where timing closure of internal signal paths of the circuit design has been achieved.

One or more embodiments presented within this specification can be implemented in the form of computer-usable program code executing within a computer. For example, functions such as mapping, placing, routing, and adjusting various settings of components of a circuit design relating to I/O interface timing can be implemented using one or more software-based Electronic Design Automation (EDA) tools. A "computer" suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

I/O devices, such as, for example, keyboards, displays, pointing devices, etc., can be coupled to the computer either directly or through intervening I/O controllers. Network adapters may also be coupled to the computer to enable the computer to become coupled to other computers, devices, or remote printers or storage devices through intervening private or public networks. Modems, cable modems, and Ethernet cards are just a few of the currently available types of network adapters.

Figure 1:
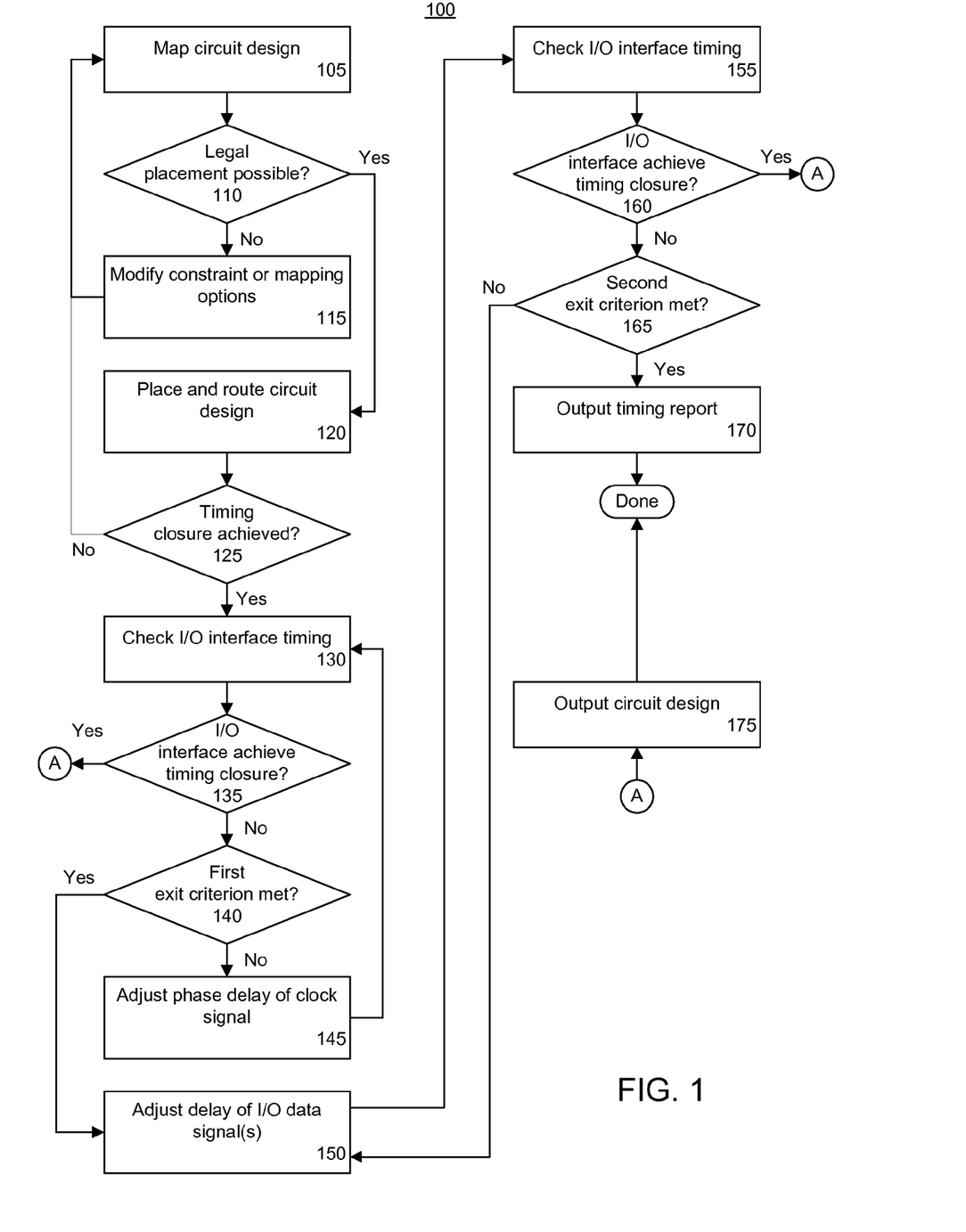
FIG. 1 is a flow chart illustrating a method of tuning an I/O interface to achieve timing closure in accordance with one embodiment of the present invention.

FIG. 1 is a flow chart illustrating a method 100 of tuning an I/O interface of a circuit design to be implemented within a programmable IC in accordance with one embodiment of the present invention. The method can be performed by a system such as a computer executing suitable software, e.g., EDA tools as described. Steps 105-125 generally relate to a process where timing closure for internal signals of the circuit design is achieved. The phrase "internal signal," as used herein, refers to a signal path, e.g., a route or collection of one or more wires, that is not coupled to an I/O interface of the circuit design. Internal signals do not enter or leave the programmable IC. The I/O interface refers to a portion of the circuit design through which data signals either enter the programmable IC or leave the programmable IC. Such data signals can be referred to as "I/O data signals." The I/O interface also can include one or more clock signals that control, or clock, the interface. As such, the I/O interface may collectively refer to one or more clock signals, one or more I/O data signals, or both clock and I/O data signals. In this regard, an I/O interface can be a collection of I/O data signals and at least one clock signal. The I/O data signals and the clock signal are related in that the I/O data signals have a defined relationship to each other and/or the clock signal in terms of timing that must be met.

Beginning in step 105, the system can map the circuit design with reference to the particular programmable IC architecture within which the circuit design will be implemented, called the target programmable IC. As noted, mapping refers to the process of identifying constructs of a programmatic description of the circuit design and mapping or assigning those constructs to physical elements, e.g., components, that are available upon the target programmable IC. It should be appreciated that the particular elements to which constructs are mapped will vary according to the architecture of the programmable IC. That is, a given construct may map to one or more particular elements of one type of programmable IC, while that same construct may map to one or more different elements of another type of programmable IC.

In step 110, the system can determine whether a legal placement is possible through application of various evaluation criteria. For example, a determination can be made as to whether a sufficient number of elements, e.g., programmable sites, on the target programmable IC exist to receive or accommodate the various constructs that were mapped. Other criteria may also be evaluated. If a legal placement is possible, the method can proceed to step 120. If a legal placement is not possible, the method can proceed to step 115, where one or more constraints or mapping options can be modified. For example, a constraint may be relaxed or a mapping of a construct can be changed to an alternative, albeit less preferred type of circuit element. After the constraint(s) or the mapping option(s) are modified, the method can loop back to step 105 to continue processing the circuit design.

Continuing with step 120, where a legal placement is possible, the system can place and route the circuit design. Placement, in general, refers to the process of assigning the various constructs, which have now been associated with a particular type of circuit component, to a particular circuit component or location on the target programmable IC. Routing refers to the process of establishing internal signal paths linking the various elements of the programmable IC. Routing within a field programmable gate array, for example, can include selecting which existing wires will be interconnected and used to establish signal paths between elements of the programmable IC in accordance with the circuit design.

In step 125, the system can determine whether timing has been achieved. More particularly, the system can evaluate the various internal signal paths within the circuit design to determine whether each internal signal path meets its associated timing requirement. That is, the system can determine whether the amount of time needed for signals to propagate, on a per signal path basis, is less than any specified timing requirement that may be specified for that signal path. When no signal path violates a timing constraint, timing closure has been achieved. When one or more signal paths violate a timing constraint, timing closure has not been achieved. When timing closure has been achieved, the method can continue to step 130. When timing closure has not been achieved, the method can loop back to step 105 to continue processing.

Once timing closure has been achieved with respect to internal signal paths of the programmable IC, method 100 can begin to evaluate the timing of the I/O interface of the circuit design. Generally, the system can determine whether the I/O interface meets any specified timing requirements. For example, I/O data signals and clock signals must be timed so that the clock signal transitions within a particular "data window" that meets setup and hold time requirements for clocking the I/O data signals of the I/O interface. This means that the phase delay of the clock signal(s) must be adjusted, the I/O data signals must be delayed, or both to achieve timing closure for the I/O interface.

Whether the phase delay of the clock, the delay of the I/O data signals, or both are modified can depend upon a variety of factors. These factors can include, the amount by which the signals must be shifted so that the clock center point, e.g., the transitioning edge of the clock, occurs in the middle of the data window specified by the timing requirements, the amount by which the clock signal may be phase delayed in the target programmable IC architecture if at all, and the amount by which the I/O data signals may be delayed within the target programmable IC architecture if at all. Depending upon one or more or all of these factors, various combinations of adjustments to the clock, the I/O data signals, or both, may be performed.

Some programmable IC architectures provide tap delays on each I/O data signal within the I/O interface. A tap delay, in general, refers to a plurality of serially arranged buffers that are clocked at a frequency that is much higher than the operational frequency of the circuit design, or at least the I/O data signal for which the tap delay is used. Each tap delay can be configured so that the I/O data signal is output from the tap delay after passing through a selected number of buffers. In this manner, the amount of delay on the I/O data signal can be programmatically selected by programming the tap delay with the number of buffers to utilize. Because the data is clocked through the tap delay much faster than the circuit design itself, the amount of delay, in terms of fractions of the period of the clock signal of the circuit design, can be achieved.

Another delay line structure can include a ring oscillator and a counter. In such a delay line structure, the number of "taps" corresponds to the number of repeats of the ring oscillator. Accordingly, the phrase "tap delay," as used within this specification, is intended to cover available types of delay line circuits, tap delay circuits, or any circuit that can be used to delay a signal by a predetermined amount of time, and for which that amount of time or delay may be controlled through a user-specified parameter of that circuit, e.g., a programmable parameter. As such, the examples provided within this specification are not intended to limit the type of tap delay used, but rather to illustrate the principles of one or more embodiments of the invention.

With regard to tap delays, the placement and routing of the circuit design need not be disturbed at all when changing the setting of the tap delay. This means that the amount of delay for any given I/O data signal may be changed by changing the setting of the tap delay for that I/O signal without having to re-map, re-place, or re-route the circuit design. The setting of the tap delay may be changed by writing a new setting to the tap delay within the circuit design. While it is not necessary to change mapping, placement, or routing of a circuit design when changing a tap delay setting of an I/O data signal, any changes to mapping, placement, and/or routing of the circuit design may have a significant effect upon the timing characteristics of the I/O interface. Once one or more of the mapping, placement, or routing changes, for example, any prior determined settings with regard to tap delays will typically no longer work and must be recalculated for the changed circuit design.

Regarding clocks, many clocks are implemented using a delay-locked loop or a phase-locked loop. Accordingly, the amount of phase delay on the clock signal may be adjusted by changing the setting of the clock. Similar to the situation with tap delays, the phase delay of the clock may be changed by writing a value to the clock within the circuit design without having to re-map, re-place, or re-route the circuit design. In some cases, tap delays may be used on clock signals. In any case, modifying the clock phase delay, as used herein, can refer to changing a parameter of a phase-locked loop or a delay-locked loop to change the phase of the clock signal or can refer to changing a setting of a tap delay that is used to delay the clock signal. As was the case for I/O data signals, changing any aspects of the circuit design relating to mapping, placement, or routing, can render phase delay settings determined for the clock useless for the changed circuit design.

Steps 130-170 are directed to a process for achieving timing closure for the I/O interface. The embodiment presented in FIG. 1 presumes that, within the target programmable IC, the timing of both I/O data signals and clock signals may be adjusted. Accordingly, in step 130, the timing of the I/O interface can be checked. For example, a static timing analysis can be performed with respect to the clock signal(s) and the I/O data signals to determine which I/O data signals do not meet timing requirements.

In step 135, the system can determine whether timing closure for the I/O interface has been achieved. That is, the system can determine whether the I/O interface meets all established timing requirements and that no timing violations have been detected with regard to the I/O data signals of the I/O interface. If no timing violations have been detected, the I/O interface can be said to have met timing or achieved timing closure. In that case, the method can proceed to step 175, where the circuit design can be output. As used herein, "outputting" and/or "output" can mean, for example, writing to a file or physical memory, writing to a user display or other output device, playing audible notifications, sending or transmitting to another system, exporting, or the like. If the I/O interface has met timing requirements, the method can end as timing closure has been achieved for both internal data signals and I/O data signals.

The timing requirements of the I/O interface can be specified by a user using any of a variety of standard delay specification techniques and/or file formats. The user also will specify any clock skew that is to be expected within the I/O interface. In order to adjust the I/O interface, the system need not know details of the I/O interface, but would need to have been programmed with signal names and the like that pass through the I/O interface.

In step 140, the system can determine whether a first exit criterion has been met. One example of an exit criterion can include the number of times the method has iterated and adjusted the clock phase delay. After a predetermined number of iterations without achieving timing closure for the I/O interface, the system can discontinue efforts to adjust the clock phase delay and, instead, begin to adjust the delay of the I/O data signals. Other criteria may be applied to determine when to discontinue adjustments of the clock phase delay in favor of adjusting delay of the I/O data signal(s).

When the first exit criterion is met, the method can proceed to step 150. When the first exit criterion is not met, the method can continue to step 145, where the clock phase delay can be modified. That is, a setting that controls the clock phase delay of the clock signal that regulates the I/O interface can be modified within the programmatic description of the circuit design.

Continuing with step 150, the delay of any I/O data signals that have been found to violate a timing requirement can be adjusted. Based upon the nature of the timing violation, each I/O data signal that violates a timing requirement may be delayed more or less by adjusting the setting of the tap delay controlling that I/O data signal.

In step 155, the system can check the I/O interface timing. In step 160, the system can determine whether timing closure has been achieved for the I/O interface. If so, the method can continue to step 175, where the circuit design can be output. The circuit design that is output will specify any modified timing settings for the I/O interface. It should be appreciated that in addition to outputting the circuit design in programmatic form, or in the alternative, the settings that were modified for the I/O interface can be output, e.g., as a text file. After step 175, the method can end as the circuit design has achieved timing closure with respect to both the internal data signals and the I/O data signals. If the I/O interface does not meet timing, the method can proceed to step 165.

In step 165, the system can determine whether a second exit criterion has been met. The second exit criterion may be any of those discussed with regard to decision box 140 and the first exit criterion, except applied to the iterations of method 100 relating to changing of the delay of one or more I/O data signals. When the second exit criterion is met, the method can continue to step 170. When the second exit criterion is not met, the method can loop back to step 150 to continue adjusting the delay of any I/O data signals that are not meeting the timing requirement(s).

In step 170, where the circuit design has not achieved timing closure with regard to the I/O interface, the system can output a timing report detailing which I/O data signals still are not meeting timing requirements and the particular clock signals that clock such I/O data signals. After step 170, the method can end.

The method illustrated in FIG. 1 is largely segmented into a first portion that attempts to achieve timing closure for the internal signal paths of the circuit design and a second portion that attempts to achieve timing closure for the I/O interface. When in the process of achieving timing closure for the I/O interface, the steps relating to map, place, and route, are not revisited. By comparison, conventional techniques for achieving timing closure for the I/O interface iterate through map, place, and route each time that timing closure is not achieved for the I/O interface. As noted, changes made to the circuit design during map, place, and route make tuning the I/O interface more difficult as any values determined for settings that control clock phase delay or I/O data signal delay are rendered useless once a change is made to the circuit design during map, place, and/or route.

Within FIG. 1, it should be appreciated that clock phase delay was selected as the first timing setting for purposes of illustration only. In another embodiment, the delay of one or more I/O data signals can be adjusted first, e.g., as the first timing setting, and, subsequently, when timing closure of the I/O interface is not achieved, clock phase delay may then be adjusted as the second timing setting.

In another embodiment, the system can determine the architecture of the target programmable IC. That is, the system can determine the model or type of the target programmable IC. The system can be programmed with knowledge of a plurality of programmable IC architectures, whether clock phase delay can be modified, the granularity, e.g., size, of the adjustments, whether the delay of I/O data signals can be delayed, the granularity of such adjustments, and the like. Accordingly, the system will not adjust clock phase delay for a particular type of programmable IC when that option is not available. The same applies with respect to delay of I/O data signals.

When both clock phase delay and delay of I/O data signals may be adjusted, for example, the system can select a particular one to adjust based upon a timing analysis and the architecture of the target programmable IC. That is, the system can select whether to adjust the clock phase delay or the delay of the I/O data signals based upon the granularity of adjustment available for each type of adjustment and the size of the adjustment needed to achieve timing closure of the I/O interface. For example, within a slower family of programmable ICs, the size of the smallest adjustment possible to a tap delay may be larger than that required if an I/O data signal need only be adjusted by a small amount. That is, delaying the I/O data signal by even a single additional buffer or tap, or decreasing the delay by a single buffer, would "overshoot" the target timing window and prevent timing closure from being achieved. In that case, the system can choose to adjust the clock phase delay, when available within that programmable IC, when the amount of clock phase delay that can be added or removed from the clock signal may be smaller that is possible on I/O data signals, thereby providing more granularity and increasing the likelihood of achieving timing closure for the I/O interface.

Conversely, within faster families of programmable ICs, tap delays may be employed on the I/O data signals to control delay and on the clock signals to control clock phase delay. In those cases, tap delays may be used for fine adjustments as opposed, or in conjunction with, adjustments to the PLL or DLL. In any case, once timing closure is achieved for the I/O interface, the circuit design, in terms of map, place, and route, can be locked.

Figure 2:
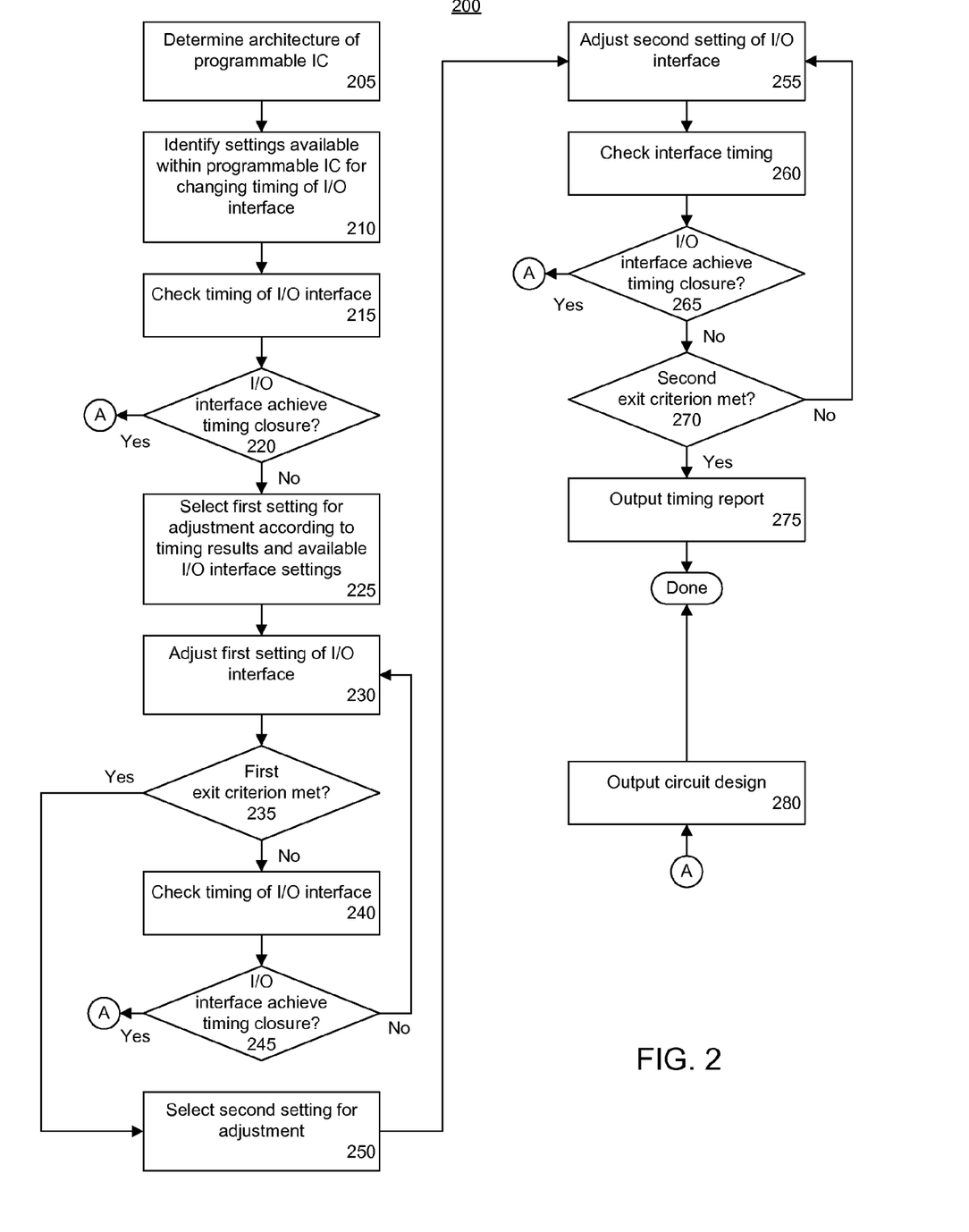
FIG. 2 is a flow chart illustrating a method of tuning an I/O interface to achieve timing closure in accordance with another embodiment of the present invention.

FIG. 2 is a flow chart illustrating a method 200 of tuning an I/O interface in accordance with another embodiment of the present invention. FIG. 2 illustrates a technique in which the system determines, based upon the architecture of the target programmable IC, whether to first attempt to adjust clock phase delay, when possible, or I/O data signal delay, when possible. For ease of illustration, the process steps relating to map, place, and route, as described with reference to FIG. 1, have been excluded from FIG. 2, but are still presumed to have been performed.

Accordingly, in step 205, the system can determine the architecture of the programmable IC. This can be determined from reading a setting or attribute embedded or specified within the circuit design or from the user manually inputting such information into the system independently of the circuit design. In step 210, the system can identify the settings available for adjustment, e.g., clock phase delay, delay of I/O data signals, or both. The system further can determine the amount of adjustment that can be incrementally made for each available setting that influences timing of the I/O interface.

In step 215, the system can check the timing of the I/O interface. In step 220, the system can determine whether the I/O interface has achieved timing closure, e.g., meets timing requirements. When timing closure of for the I/O interface has been achieved, the method can continue to step 280, where the circuit design and/or the settings of the I/O interface can be output. After step 280, the method can end. When the I/O interface does not meet timing, the method can continue to step 225. In step 225, the system can select a first setting for adjustment according to timing results and available I/O interface settings. For example, the system can select a particular setting to be adjusted, e.g., tap delays of I/O data signals or clock phase delay, according to the amount of adjustment provided by each setting in view of the amount the I/O interface needs to be adjusted in order to achieve timing closure. The system can select the setting that provides an amount of timing adjustment that is closest to the amount required, for example, without going over.

If, for example, an I/O data signal must be delayed by 1 nanosecond, and the minimum adjustment for the clock phase delay provides for more than one nanosecond, but the tap delays provide for less than 1 nanosecond, the tap delays can be selected for adjustment. The setting for the tap delays can be selected as the first setting.

In step 230, the first setting of the I/O interface can be adjusted. In step 235, the system can determine whether a first exit criterion has been met. When the first exit criterion has been met, the method can continue to step 250. When the first exit criterion has not been met, the method can continue to step 240, where timing of the I/O interface can be checked. After step 240, the method can loop back to step 230 to continue processing.

In step 250, the system can select a second setting for adjustment. When the first setting is selected to be the clock phase delay, the second setting can be selected to be the delay of the I/O data signals. When the first setting is selected to be the delay of the I/O data signals, the second setting can be selected to be the clock phase delay.

In step 255, the system can adjust the second setting. In step 260, the system can check the timing of the I/O interface and, in step 265, determine whether timing closure has been achieved for the I/O interface. When timing closure has been achieved, the method can proceed to step 280, where the circuit design and/or I/O interface timing settings can be output. When timing closure is not achieved, the method can proceed to step 270, where the system determines whether a second exit criterion has been met. When the second exit criterion has been met, the method can proceed to step 275, where a timing report can be output detailing any I/O data signals that do not meet timing requirements as well as the clock signals that clock the I/O data signals. When the second exit criterion has not been met, the method can loop back to step 255 to continue processing.

One or more embodiments presented with reference to FIGS. 1 and 2 presume the availability of more than one type of setting for the programmable IC. If, however, a single setting is available, it should be appreciated that the system can iteratively adjust that setting until either an exit criterion is met or the I/O interface achieves timing.

In another embodiment, each time a timing check is performed, rather than continuing to adjust the same selected setting, the particular setting to be adjusted can be selected after each timing analysis based upon the timing results and the available I/O settings as described. For example, after performing step 245 of FIG. 2, the method can loop back to step 225 to determine whether to continue using the first setting or possibly choose another setting based upon the timing results for the I/O interface. In such an embodiment, rather than iteratively adjusting a first setting and then iteratively adjusting a second setting, the method would intelligently select the timing setting to be adjusted after each timing check.

One or more embodiments described with reference to FIGS. 1 and 2 can be implemented in the form of a single EDA tool capable of performing the steps disclosed herein or as two or more separate EDA tools. For example, a first EDA tool can be used to perform and/or achieve timing closure of internal signals and a second EDA tool can be used to achieve timing closure of the I/O interface after place and route has been performed and locked. In still another embodiment, the various steps can be invoked using a script that invokes one or more EDA tools that perform each of the tasks described.

One or more embodiments described with reference to FIGS. 1 and 2 separated the timing closure process of the internal signals from the timing closure process of the I/O interface. In another embodiment, however, the timing closure process for the I/O interface can be incorporated within, or performed as part of, the place and route phase of circuit design implementation.

The flowcharts in the figures illustrate the architecture, functionality, and operation of possible implementations of systems, methods and computer program products according to various embodiments of the present invention. In this regard, each block in the flowcharts may represent a module, segment, or portion of code, which comprises one or more portions of computer-usable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and computer instructions.

One or more embodiments of the present invention can be realized as a combination of hardware and software. One or more embodiments can be realized in a centralized fashion in one data processing system or in a distributed fashion where different elements are spread across several interconnected data processing systems. Any kind of data processing system or other apparatus adapted for carrying out the methods described herein is suited. A typical combination of hardware and software can be a general-purpose computer system with a computer program that, when being loaded and executed, controls the computer system such that it carries out the methods described herein.

One or more embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, computer memory, one or more portions of a wired or wireless network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A method of tuning an input/output (I/O) interface of a circuit design for a selected programmable integrated circuit, the method comprising:

determining that the I/O interface does not meet a timing requirement and an amount of adjustment required to meet the timing requirement;
determining a granularity of adjustment for a first timing adjustment technique corresponding to clock phase delay and a granularity of adjustment for a second timing adjustment technique corresponding to delay of an I/O data signal available from the selected programmable integrated circuit;
comparing the amount of adjustment required by the I/O interface with the granularity of adjustment for the first timing adjustment technique and the granularity of adjustment for the second timing adjustment technique;
automatically selecting a timing adjustment technique according to the comparing; and
adjusting, using a processor, a timing setting using the selected timing adjustment technique.

2. The method of claim 1, wherein the timing setting is adjusted using the first timing adjustment technique.

3. The method of claim 1, wherein the timing setting is adjusted using the second timing adjustment technique.

4. The method of claim 1, further comprising:
iteratively performing the determining that the I/O interface does not meet a timing requirement and the amount of adjustment required to meet the timing requirement, the comparing, the selecting a timing adjustment technique, and the adjusting;
wherein the selecting the timing adjustment technique is performed responsive to each determination that the I/O interface does not meet the timing requirement.

5. The method of claim 4, further comprising:
adjusting the timing setting using the first timing adjustment technique in at least one iteration; and
adjusting the timing setting using the second timing adjustment technique in at least one other iteration.

6. The method of claim 1, wherein adjusting the timing setting is performed without changing routing or placement of the circuit design.

7. The method of claim 1, further comprising:
determining whether the granularity of adjustment for the first timing adjustment technique exceeds the amount of adjustment required to meet the timing requirement;
wherein the second timing adjustment technique is selected responsive to determining that the granularity of adjustment for the first timing adjustment technique exceeds the amount of adjustment required to meet the timing requirement.

8. The method of claim 1, further comprising:
determining whether the granularity of adjustment for the second timing adjustment technique exceeds the amount of adjustment required to meet the timing requirement;
wherein the first timing adjustment technique is selected responsive to determining that the granularity of adjustment for the second timing adjustment technique exceeds the amount of adjustment required to meet the timing requirement.

9. A method of tuning an input/output (I/O) interface of a circuit design for a selected programmable integrated circuit, the method comprising:
determining that the I/O interface does not meet a timing requirement and an amount of adjustment required to meet the timing requirement;
determining a granularity of adjustment for each of a plurality of different timing adjustment techniques available for the selected programmable integrated circuit;
comparing the amount of adjustment required by the I/O interface with the granularity of adjustment for each of the plurality of different timing adjustment techniques;
selecting a timing adjustment technique for the I/O interface from the plurality of different timing adjustment techniques for the I/O interface according to the comparing; and
automatically adjusting, using a processor, a timing setting of the I/O interface of the circuit design using the selected timing adjustment technique.

10. The method of claim 9, wherein the selected timing adjustment technique alters clock phase delay.

11. The method of claim 9, wherein the selected timing adjustment technique alters delay of an I/O data signal.

12. The method of claim 9, further comprising only adjusting the timing setting after performing place and route and after achieving timing closure of internal signals of the circuit design.

13. The method of claim 9, further comprising adjusting the timing setting during place and route concurrently with achieving timing closure for internal signals of the circuit design.

14. The method of claim 9, further comprising:
determining the granularity of adjustment of a timing adjustment technique of the plurality of different timing adjustment techniques that is less than the amount of adjustment required to meet the timing requirement as the selected timing adjustment technique.

15. The method of claim 9, wherein adjusting the timing setting is performed without changing routing of the circuit design.

16. The method of claim 9, wherein a first of the timing adjustment techniques corresponds to adjusting phase delay of a clock signal for the I/O interface and a second of the timing adjustment techniques corresponds to adjusting a delay of at least one data signal to the I/O interface.

17. A computer program product comprising:
a non-transitory computer-usable medium comprising computer-usable program code that tunes an input/output (I/O) interface of a circuit design for a selected programmable integrated circuit, the computer-usable medium comprising:
computer-usable program code that determines that the I/O interface does not meet a timing requirement and an amount of adjustment required to meet the timing requirement;
computer-usable program code that determines a granularity of adjustment for a first timing adjustment technique corresponding to clock phase delay and a granularity of adjustment for a second timing adjustment technique corresponding to delay of an I/O data signal available from the selected programmable integrated circuit;
computer-usable program code that compares the amount of adjustment required by the I/O interface with the granularity of adjustment for the first timing adjustment technique and the granularity of adjustment for the second timing adjustment technique;
computer-usable program code that automatically selects a timing adjustment technique according to the comparison; and
computer-usable program code that adjusts a timing setting using the selected timing adjustment technique.

18. The computer program product of claim 17, further comprising:
computer-usable program code that determines whether the granularity of adjustment for the first timing adjustment technique exceeds the amount of adjustment required to meet the timing requirement;

wherein the second timing adjustment technique is selected responsive to determining that the granularity of adjustment for the first timing adjustment technique exceeds the amount of adjustment required to meet the timing requirement.

19. The computer program product of claim 17, further comprising:

computer-usable program code that determines whether the granularity of adjustment for the second timing adjustment technique exceeds the amount of adjustment required to meet the timing requirement;

wherein the first timing adjustment technique is selected responsive to determining that the granularity of adjustment for the second timing adjustment technique exceeds the amount of adjustment required to meet the timing requirement.

20. The computer program product of claim 17, further comprising:

computer-usable program code that iteratively performs the determining that the I/O interface does not meet a timing requirement and the amount of adjustment required to meet the timing requirement, the comparing, the selecting a timing adjustment technique, and the adjusting;

wherein the selecting the timing adjustment technique is performed responsive to each determination that the I/O interface does not meet the timing requirement.

* * * * *